May 21, 1929. G. G. GILPIN 1,713,898
END DOOR FOR AUTOMOBILE CARS
Filed Nov. 9, 1925  3 Sheets-Sheet 2
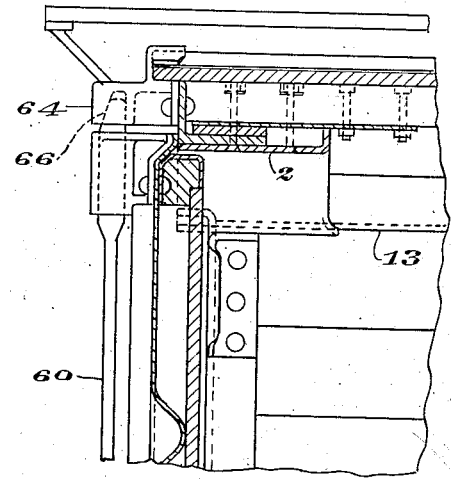
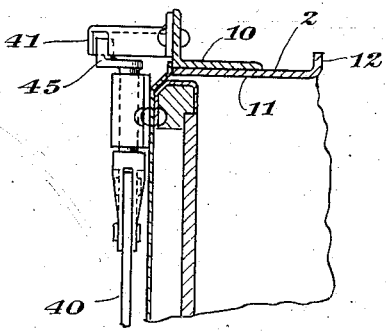
Fig. 3
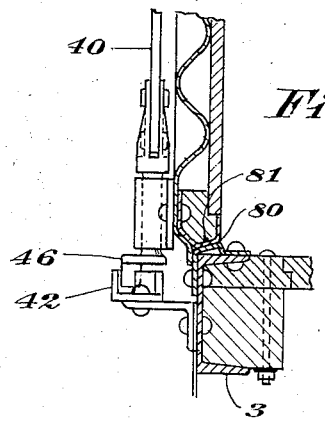
Fig. 4
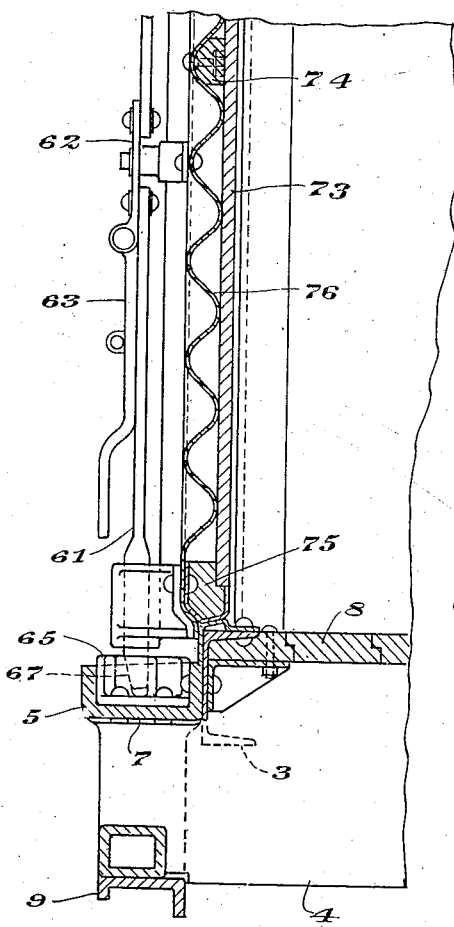
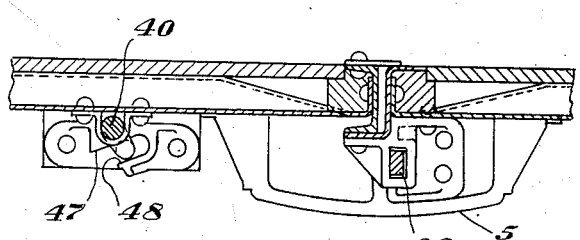
Fig. 5
Fig. 2
Inventor
Garth G. Gilpin
Clinton E. Sisson
Attorney May 21, 1929.  G. G. GILPIN  1,713,898
END DOOR FOR AUTOMOBILE CARS
Filed Nov. 9, 1925  3 Sheets-Sheet 3
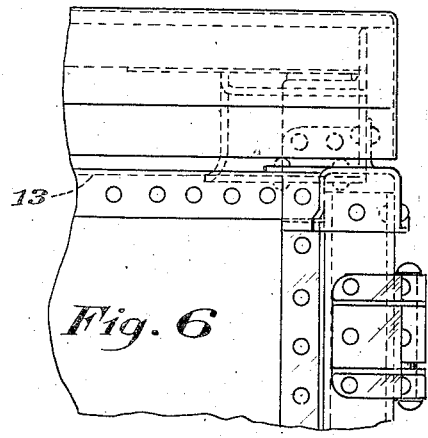
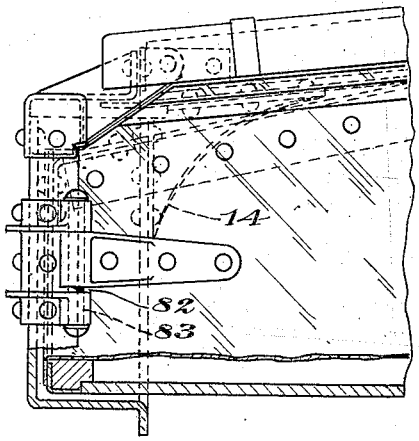
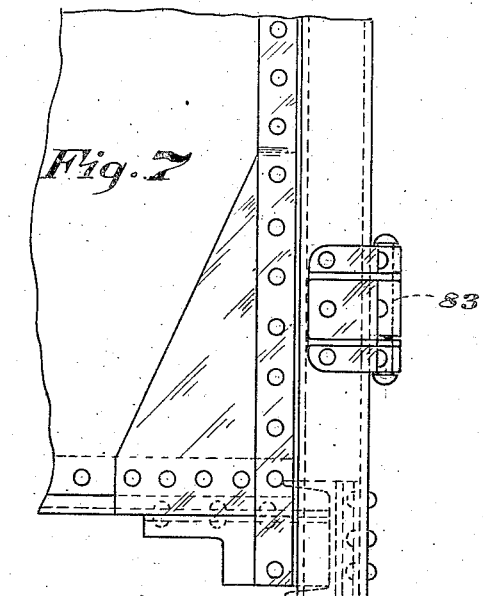
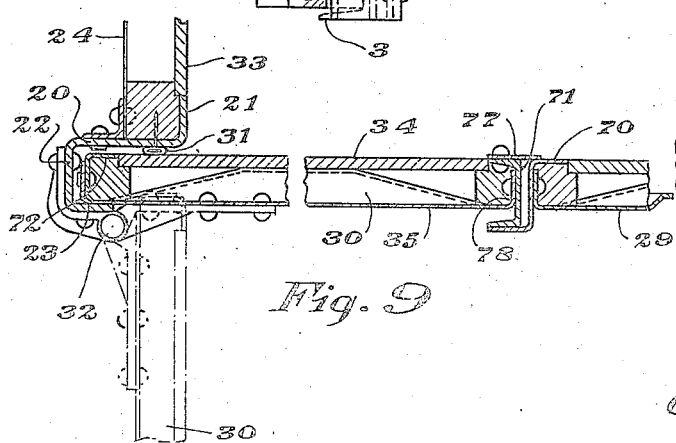
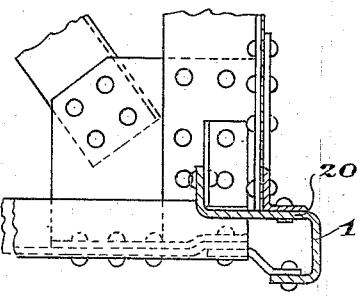
Inventor
Garth G. Gilpin Patented May 21, 1929.

1,713,898

UNITED STATES PATENT OFFICE.

GARTH G. GILPIN, OF RIVERSIDE, ILLINOIS, ASSIGNOR TO UNION METAL PRODUCTS COMPANY, OF CHICAGO, ILLINOIS, A CORPORATION OF DELAWARE.

END DOOR FOR AUTOMOBILE CARS.

Application filed November 9, 1925. Serial No. 67,921.

This invention relates to large railway box cars known as "automobile cars" having one of their end walls composed of doors to facilitate the loading or unloading of automotive cars and trucks or the like. Such an arrangement materially weakens the car framing to resist the service stresses. It is difficult to design the end frame of such a car, the attachments of the doors and the doors themselves so as to resist the weaving stresses of the car in service and the shifting cargo and at the same time obtain a door which is easy to operate, weather-proof and burglar-proof and which, when open, will give an opening as wide as the inside of the car. Automobile cars are used in general service so must be capable of carrying various types of lading as well as those mentioned above.

In the drawings:

Fig. 2 is a section on line 2—2 of Fig. 1.

Figure 1:
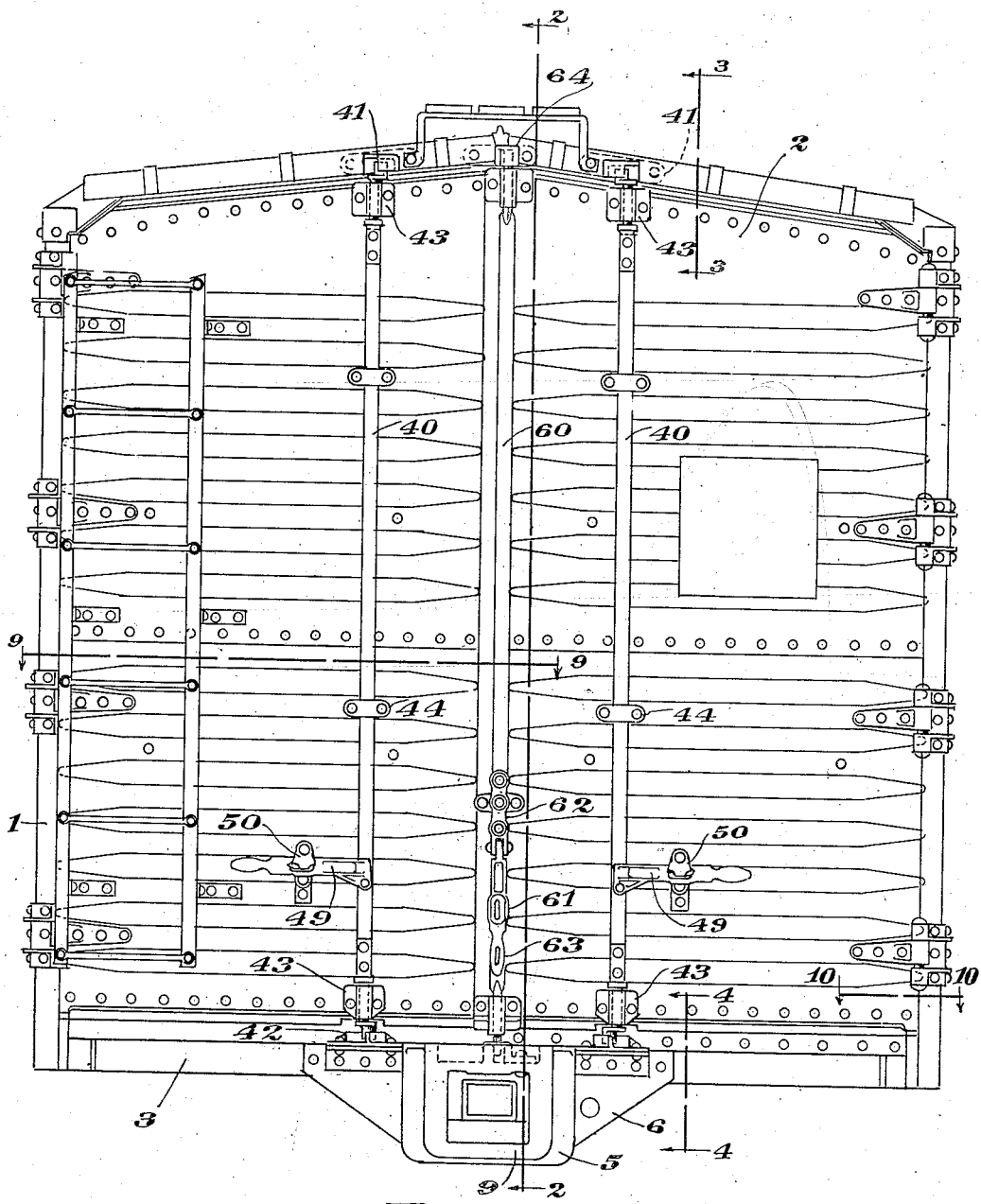
Fig. 1 shows the end of a railway car with my device applied thereon.

Figs. 3 and 4 show the eccentric rod arrangement drawn on lines 3—3 and 4—4, respectively, of Fig. 1.

Fig. 5 is a section on line 5—5 of Fig. 1.

Figs. 6 and 7 are enlarged side elevations of Fig. 1.

Fig. 8 is a front elevation of Fig. 6.

Fig. 9 is an enlarged section on line 9—9 of Fig. 1.

Fig. 10 is an enlarged section on line 10—10 of Fig. 1.

In my construction the corner posts, end plate and end sill are securely fastened together to form a rigid frame to resist the service weaving stresses of the car in motion and swinging doors are provided to retain the cargo, which doors must transmit the static as well as the quiescent loads imposed by the cargo against the end wall to the rigid frame. The doors are independently hinged to the opposite corner posts (or frame members) of the car and when closed meet adjacent the medial line of the car and have an overlapped relation, that is, the outside door is provided with a part which overlaps the inside door. The object of this overlapped relation is for weather-proofing and to retain the doors in a closed position. Means are provided to force the door closed which means, together with separate locking means, resist the thrust of the cargo.

The center sills 4 project beyond the end sill 3 and are tied together and to the end sill by the striking casting 5 and are further braced by gussets 6. The distance from the underside 7 of the striking casting 5 to the rail is the American Railroad Association standard and as a low floor is desirable in such cars, the distance between the underside 7 of the striking casting and the upper surface of the floor 8 is necessarily very small so that it is advisable to reinforce this portion of the end sill by a striking casting which preferably has an integral lower member 9.

To facilitate the loading of high automobile trucks a very shallow end plate 2 is used but at the same time it has great strength in a horizontal direction. The composite member shown is made up of angle 10 secured to the metallic plate 11, which plate has an upturned rear flange 12 to prevent buckling. This flat plate extends from side plate to side plate (13) and is rigidly secured thereto and is bent to parallel the slopes of the roof. The connection of the end plate to the corner post is reinforced by gussets 14.

The corner post of a railway box car is a part of the retaining side wall of the car, and as such, must resist horizontal stresses; furthermore, it is the end strut of the side truss of the car, and as such, must act as a column. The ordinary rigid end wall of a box car reinforces the corner post to perform both of these functions, but as there is no rigid end wall in an automobile car, the corner post must be designed to resist these stresses, i. e., as a vertical beam and as a column. My preferred form of corner post 1 comprises a main portion 20, a rearwardly extending flange 21, a forwardly extending web 22 and an inwardly extending flange 23, whereby the members 20, 22 and 23 form a recess. The main portion 20 is a beam of considerable strength to resist the lateral stresses and is reinforced to resist such stresses by the rearwardly extending flange 21 and the forwardly extending web 22, which members form a Z-section. This Z-section is also a strut of considerable strength enabling the post to act as a column. The web 22, with the portion 20 and the flange 23, may be described as a U-shaped member with a long and a short arm. The side wall 24 is attached to the main portion of the corner post.

The door (29 or 30) is hinged to the recessed corner post 1 (or side wall of the car) so that a portion of it will swing behind the flange 23 and preferably engage or contact with it and a rubber hose 31 or other plastic material may be placed between the door and the corner post (secured to either one) to form a tight joint and to force the door against the flange 23. The hinges comprise butt and strap parts which are connected by a single pivot so as to permit horizontal movement between these component parts (so-called a loose hinge) so that any substantially horizontal load imposed upon the inner part of the door is resisted by the corner post independently of the hinges. The hinge point 32 of the door is positioned outside the inside plane 33 of the car wall a distance greater than that between the bounding planes 34—35 of the door so that when the doors are opened the distance between the opposite doors will be the same as, or greater than, the inside width of the car, as shown by dot and dash lines in Fig. 9.

An eccentric rod 40 is mounted upon each door operably engageable with devices 41—42 upon the car body to swing the top and bottom of the door simultaneously toward or away from the car. The eccentric mechanism comprises the rod 40 which is rotatably mounted upon the door by brackets 43 and 44. This rod has eccentric portions 45—46 which upon rotation of the rod engage the inclined surfaces of members 47—48 and force the door outwardly or inwardly as desired. The operating handle 49 is provided with means 50 to lock it in a predetermined position when the door is closed. This is not only to prevent pilfering but also to prevent the eccentric rod from revolving when a shifting load imposes a horizontal force upon the inside of the door.

The bolts 60 and 61 are mounted on the outside door 29 adjacent the overlapping portion of the door and are connected by the arm 62 which is provided with a handle 63. Movement of the arm simultaneously engages (or disengages) bolts 60 and 61 with members 64—65 positioned adjacent the top and bottom, respectively, of the doors so as to retain the doors in a closed position. The lower of these members may be made integral with the striking casting or is otherwise rigidly secured to the car body. These bolts are provided with inclined surfaces 66—67 to assist in forcing the door closed.

The end door comprises a metallic plate reinforced on its edges by flanges 78 and stiffeners 70—71 and on its outside edge by the integral flange and stiffener 72. The inside lining 73 is nailed to wooden strips 74 positioned within the corrugations and other nailing strips 75 positioned near the stiffening members. The metallic plate is reinforced and stiffened with integral corrugations 76 which extend behind the inwardly extending flange 23 of the corner post 1 so that a portion of the load is transmitted from the corrugations to the flange 23 independent of the stiffening members 72. The opposite ends of the corrugations extend in close proximity to the vertical stiffeners 70—71. The stiffeners provide an overlapping feature, that is, the stiffener on the outside door 29 overlaps the stiffener on the inside door 30. In the construction illustrated the channel section stiffener 71 on the inside door is overlapped by the Z-section stiffener 70 on the outside door. The plate 77 prevents the leakage of grain or similar commodities and weather-proofs the joint between the doors.

The weaving of the car in motion tends to distort the rectangularity of the end frame of the car and if the door is hinged to this frame in the usual manner, the weaving motion also has a tendency to distort the doors themselves, to break or bend the hinges and to open up the joints between the door and the car body, thereby causing leakage of the cargo from within and allowing rain, etc., to enter the car from without. The static or quiescent thrust of the cargo against the inside of the door in the ordinary construction is resisted (along one edge of the door at least) by the hinges, which thrusts tend to break or distort them.

The threshold 80 of this door opening is inclined inwardly and upwardly and means are provided to draw the door on and up this inclined threshold so that its vertical weight is transferred from the hinges to the threshold plate. The bottom edge of the door may be correspondingly inclined (81). Clearance is provided between the outside vertical edge of the door and the adjacent frame members and also between the top edge of the door and the end plate so that when the door is closed and the car weaves the weaving stresses are not transmitted to the door proper. In the construction illustrated, the means to force the door up and on the threshold comprises the eccentric rod 40 and its associated parts, heretofore described.

Each hinge comprises a single butt member secured to the car body and a single strap member secured to the door, said members being pivotally secured to each other by a single vertically positioned pin 83. The component parts are arranged to provide vertical clearance 82 and horizontal clearance is obtained by making the pin holes in the strap and butt sufficiently larger than the pin 83.

The operation of the door is as follows:
The inside door is moved to substantially closed position and its eccentric rod is rotated; thus forcing this door into a completely closed position. The outside door is then swung to substantially closed position and its eccentric rod is operated to force this door into a completely closed position. The arm 63 is then operated to force the bolts into their sockets on the car body which holds both doors in closed position. The eccentric rod and bolts are then locked in these positions. The car is thus doubly locked against pilfering, and furthermore, any shifting of the lading or static impact of the cargo is resisted by both eccentric rods, by both ends of the central bolt (6 points in all) as well as by the corner post. To open the door the operation is reversed. The eccentric rods give the door its initial open movement, thus assisting in overcoming any sticking or wedging of the door. These eccentric rods also give the door its final closing movement, thus wedging the door tightly in place and overcoming any friction of the parts.

The accompanying drawings illustrate the preferred form of the invention, though it is to be understood that the invention is not limited to the exact details of construction shown and described, as it is obvious that various modifications thereof within the scope of the claims will occur to persons skilled in the art.

I claim:

1. In a railway car, the combination of a frame member, and single pivot hinges pivotally supporting a door upon said frame member so that the door will swing behind an inner part of said frame member when in closed position, each of said hinges arranged to provide horizontal movement between its hinge and strap parts so that said door may engage said inner part whereby any substantially horizontal load imposed upon the inside of the door is resisted by the frame member independently of the hinges.

2. In a railway car, the combination of a frame member, and single pivot hinges pivotally supporting a door upon said frame member, said door provided with corrugations extending normal to said frame member so that the door and a portion of the corrugations will swing behind an inner part of said frame member when in a closed position, each of said hinges arranged to provide horizontal movement between its hinge and strap parts so that said door may engage said inner part whereby any substantially horizontal load imposed upon the corrugations is resisted by the frame member independently of the hinges.

3. In a railway car having a door opening, the combination of a frame member adjacent said opening, and single pivot hinges pivotally supporting a door upon said frame member so that the door will swing behind an inner part of said frame member when in a closed position, each of said hinges arranged to provide horizontal movement between its hinge and strap parts so that said door may engage said inner part whereby any substantially horizontal load imposed upon the inside of the door is resisted by the frame member independently of the hinges, the hinge point of the door being so located that the door, when in open position, does not restrict said door opening.

4. In a railway car, the combination of a corner post for a railway car of channel section with a short arm and a long arm flanged at its outer edge, and a hinge mounted upon said short arm supporting a door so that it swings within said channel section.

5. In a railway car, the combination of a door opening with an inclined threshold, a vertical frame member adjacent one side of said opening, hinges pivotally supporting a door upon said frame member so that the door will swing behind an inner part of said frame member when in closed position, and means to draw said door up and on said inclined threshold, each of said hinges arranged to provide vertical movement between its component parts so that the weight of the door is transferred from the hinges to the threshold as the door is closed.

6. In a railway car, the combination of a door opening with an inclined threshold, a vertical frame member adjacent one side of said opening, hinges pivotally supporting a door upon said frame member so that the door will swing behind an inner part of said frame member when in closed position, and means to draw said door up and on said inclined threshold, each of said hinges arranged to provide vertical and horizontal movement between its component parts so that the weight of the door is transferred from the hinges to the threshold as the door is closed and so that said door may engage said inner part whereby any substantially horizontal load imposed upon the inside of the door is resisted by the frame member independently of the hinges.

GARTH G. GILPIN.